US008538885B2

(12) United States Patent
Faith et al.

(10) Patent No.: US 8,538,885 B2
(45) Date of Patent: Sep. 17, 2013

(54) ENCRYPTION SWITCH PROCESSING

(71) Applicants: Patrick L. Faith, Pleasanton, CA (US);
Kris Koganti, Cupertino, CA (US);
Ayman Hammad, Pleasanton, CA (US);
Ben Rewis, Oakland, CA (US)

(72) Inventors: Patrick L. Faith, Pleasanton, CA (US);
Kris Koganti, Cupertino, CA (US);
Ayman Hammad, Pleasanton, CA (US);
Ben Rewis, Oakland, CA (US)

( * ) Notice: Subject to any disclaimer, the term of this patent is extended or adjusted under 35 U.S.C. 154(b) by 0 days.

(21) Appl. No.: 13/660,894

(22) Filed: Oct. 25, 2012

(65) Prior Publication Data

US 2013/0066781 A1 Mar. 14, 2013

Related U.S. Application Data

(63) Continuation of application No. 12/917,830, filed on Nov. 2, 2010, now Pat. No. 8,332,325.

(60) Provisional application No. 61/257,183, filed on Nov. 2, 2009.

(51) Int. Cl.
*G06Q 20/00* (2012.01)
*G06Q 30/00* (2012.01)

(52) U.S. Cl.
USPC .............. 705/50; 705/26.41; 705/44; 705/39

(58) Field of Classification Search
USPC .................... 705/50, 51, 53, 64, 67, 75, 79
See application file for complete search history.

(56) References Cited

U.S. PATENT DOCUMENTS

| | | | |
|---|---|---|---|
| 5,450,537 A | 9/1995 | Hirai et al. | |
| 5,640,577 A | 6/1997 | Scharmer | |
| 5,742,845 A | 4/1998 | Wagner | |
| 5,794,259 A | 8/1998 | Kikinis | |
| 5,974,430 A | 10/1999 | Mutschler, III et al. | |
| 6,044,349 A | 3/2000 | Tolopka et al. | |
| 6,067,621 A | 5/2000 | Yu et al. | |
| 6,421,729 B1 | 7/2002 | Paltenghe et al. | |
| 6,490,601 B1 | 12/2002 | Markus et al. | |
| 6,499,042 B1 | 12/2002 | Markus | |

(Continued)

FOREIGN PATENT DOCUMENTS

| WO | WO2005/031541 A2 * | 4/2005 |
|---|---|---|
| WO | WO2005031541 | 4/2005 |
| WO | WO2009052634 | 4/2009 |

OTHER PUBLICATIONS

Acosta ("Online Payment Process", E-Business Technologies—SS2008 paper, Jun. 16, 2008, 15 pages).*

(Continued)

*Primary Examiner* — James D Nigh
(74) *Attorney, Agent, or Firm* — Kilpatrick Townsend Stockton LLP

(57) ABSTRACT

A method for delivering non-financial electronic data through a secure communications channel between a payment processing network and an access device is disclosed. One embodiment of the invention is directed to a method comprising receiving, at a payment processing network, a request to establish a secure communications channel between a consumer device and the payment processing network. Upon establishing a secure communications channel with the consumer device, the payment processor network receives non-financial electronic content from a merchant at the payment processing network where the non-financial electronic content is selected at the merchant by a user associated with the consumer device. The non-financial electronic content is sent to the consumer device from the payment processing network via the secure communications channel between the consumer device and the payment processing network.

20 Claims, 10 Drawing Sheets

(56) References Cited

U.S. PATENT DOCUMENTS

| | | |
|---|---|---|
| 6,571,339 B1 | 5/2003 | Danneels et al. |
| 6,850,996 B2 | 2/2005 | Wagner |
| 6,873,974 B1 | 3/2005 | Schutzer |
| 6,907,476 B2 | 6/2005 | Wagner |
| 6,983,882 B2 | 1/2006 | Cassone |
| 6,990,470 B2 * | 1/2006 | Hogan et al. .................... 705/64 |
| 7,058,611 B2 * | 6/2006 | Kranzley et al. ................ 705/64 |
| 7,062,706 B2 | 6/2006 | Maxwell et al. |
| 7,111,324 B2 | 9/2006 | Elteto et al. |
| 7,159,180 B2 | 1/2007 | Ward |
| 7,210,169 B2 | 4/2007 | Smith et al. |
| 7,216,292 B1 | 5/2007 | Snapper et al. |
| 7,231,045 B1 | 6/2007 | Parrott |
| 7,254,569 B2 | 8/2007 | Goodman et al. |
| 7,257,581 B1 | 8/2007 | Steele et al. |
| 7,275,263 B2 | 9/2007 | Bajikar et al. |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,356,706 B2 | 4/2008 | Scheurich |
| 7,366,703 B2 | 4/2008 | Gray et al. |
| 7,379,919 B2 | 5/2008 | Hogan et al. |
| 7,412,420 B2 | 8/2008 | Holdsworth |
| 7,415,443 B2 | 8/2008 | Hobson et al. |
| 7,437,575 B2 | 10/2008 | Dennis et al. |
| 7,437,757 B2 | 10/2008 | Holdsworth |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,568,631 B2 | 8/2009 | Gibbs et al. |
| 7,580,898 B2 | 8/2009 | Brown et al. |
| 7,584,153 B2 | 9/2009 | Brown et al. |
| 7,627,531 B2 | 12/2009 | Breck et al. |
| 7,660,779 B2 | 2/2010 | Goodman et al. |
| 7,664,699 B1 | 2/2010 | Powell |
| 7,716,596 B2 | 5/2010 | Cao et al. |
| 7,761,374 B2 | 7/2010 | Sahota et al. |
| 7,849,014 B2 | 12/2010 | Erikson |
| 2001/0032182 A1 | 10/2001 | Kumar et al. |
| 2001/0054148 A1 | 12/2001 | Hoornaert et al. |
| 2002/0128973 A1 * | 9/2002 | Kranzley et al. ................ 705/53 |
| 2002/0157002 A1 * | 10/2002 | Messerges et al. ........... 713/155 |
| 2003/0115142 A1 | 6/2003 | Brickell et al. |
| 2005/0043997 A1 | 2/2005 | Sahota et al. |
| 2006/0168653 A1 | 7/2006 | Contrera |
| 2006/0294023 A1 | 12/2006 | Lu |
| 2007/0178883 A1 | 8/2007 | Nandagopal |
| 2008/0109362 A1 * | 5/2008 | Fransdonk ....................... 705/51 |
| 2008/0110983 A1 | 5/2008 | Ashfield |
| 2008/0154770 A1 * | 6/2008 | Rutherford et al. ............. 705/44 |
| 2008/0177796 A1 | 7/2008 | Eldering |
| 2008/0228653 A1 | 9/2008 | Holdsworth |
| 2008/0289022 A1 | 11/2008 | Chiu |
| 2009/0006646 A1 | 1/2009 | Duarte |
| 2009/0173782 A1 | 7/2009 | Muscato |
| 2009/0287931 A1 * | 11/2009 | Kinsella ........................ 713/175 |
| 2009/0307493 A1 | 12/2009 | Smith |
| 2010/0114776 A1 | 5/2010 | Weller et al. |
| 2010/0223184 A1 | 9/2010 | Perlman |
| 2010/0257102 A1 | 10/2010 | Perlman |
| 2010/0274692 A1 | 10/2010 | Hammad |
| 2010/0274721 A1 | 10/2010 | Hammad |
| 2010/0293189 A1 | 11/2010 | Hammad |
| 2010/0293382 A1 | 11/2010 | Hammad |
| 2011/0022521 A1 * | 1/2011 | Collinge et al. ................ 705/67 |

OTHER PUBLICATIONS

Acosta ("Online Payment Process", E-Business Technologies—SS2008 paper, Jun. 16, 2008).

* cited by examiner

810

820

830

Please Enter Information Below

| Did you receive the electronic goods in a timely manner? | _____ (Yes or No) |
| Which Merchant did you purchase the electronic goods from? | _____ (Name of Merchant) |
| Are you happy with your purchase? | _____ (Yes or No) |

ENCRYPTION SWITCH PROCESSING

CROSS-REFERENCES TO RELATED APPLICATIONS

This application is a continuation of U.S. patent application Ser. No. 12/917,830, filed Nov. 2, 2010, which claims priority to U.S. Provisional Application No. 61/257,183, filed on Nov. 2, 2009, all of which are herein incorporated by reference for all purposes.

BACKGROUND

Some have estimated that over 70% of the goods and services purchased in the future will relate to electronic processing or the electronic delivery of electronic content. Examples of such electronic content include electronic books, music and movies. Currently, electronic goods are typically sent directly from a merchant to a purchaser of the electronic goods. However, more efficient and effective ways to transmit electronic content are desirable. For example, a more efficient way to provide the purchaser a remedy for a glitch in the electronic content would be desirable. Additionally, better consumer marketing according to the types of electronic goods typically purchased by the purchaser would be desirable. Moreover, it would also be desirable to link the delivery of electronic content (financial and non-financial) to traditional payment data such as credit and debit card data.

Embodiments of the invention address these and other problems individually and collectively.

BRIEF SUMMARY

Embodiments of the invention are directed to a framework for the delivery of non-financial electronic content between a payment processing network and a consumer device over a secure communications channel.

One embodiment of the invention is directed to a method comprising receiving, at a payment processing network, a request to establish a secure communications channel between a consumer device and the payment processing network. Upon establishing a secure communications channel with the consumer device, the payment processor network receives non-financial electronic content from a merchant at the payment processing network where the non-financial electronic content is selected at the merchant by a user associated with the consumer device. The non-financial electronic content is sent to the consumer device from the payment processing network via the secure communications channel between the consumer device and the payment processing network.

Another embodiment of the invention is directed to a method comprising sending, at a consumer device, a request to establish a secure communications channel between the consumer device and a payment processing network. Upon establishing a secure communications channel with the payment processing network, non-financial electronic content is sent from the payment processing network to the consumer device via the secure communications channel between the consumer device and the payment processing network. The non-financial electronic content was sent by a merchant to the payment processing network (before it was sent to the consumer device) and was selected at a merchant by a user associated with the consumer device.

In a specific example, a user places an order at a merchant Web site for the purchase of an electronic song. Typically, the merchant would directly send the user the electronic song over the Internet. According to the present invention, a secure communications channel is first established between an access device (i.e. consumer device) associated with the user (such as the user's computer terminal) and a payment processing network. The electronic song ordered by the user is then sent from the merchant to the payment processing network, which then sends the electronic song to the access device associated with the user through the secure communications channel between the access device and the payment processing network. By sending the purchased electronic goods to the user through the secure communications channel, the delivery of the electronic goods is assured and certified because the secure communications channel is trusted from both ends of the channel. Also, the payment processing network can act as a guarantor of sorts, by guaranteeing that the electronic content was delivered to the user and by confirming that the user has received the electronic content. Further, the payment processor network can send the user any necessary patches to damaged electronic content instead of the user having to request patches directly from the merchant. These benefits, among others, provide for a more efficient and effective way of delivering electronic data.

Other embodiments of the invention are described in further detail below. Other embodiments of the invention may relate to specific types of frameworks for the delivery of non-financial electronic content (and secure transmission thereof) and the functionality corresponding to such frameworks.

BRIEF DESCRIPTION OF THE DRAWINGS

FIG. 8 shows a screen shot of a prompt message according to an embodiment of the invention.

DETAILED DESCRIPTION

Figure 1A:
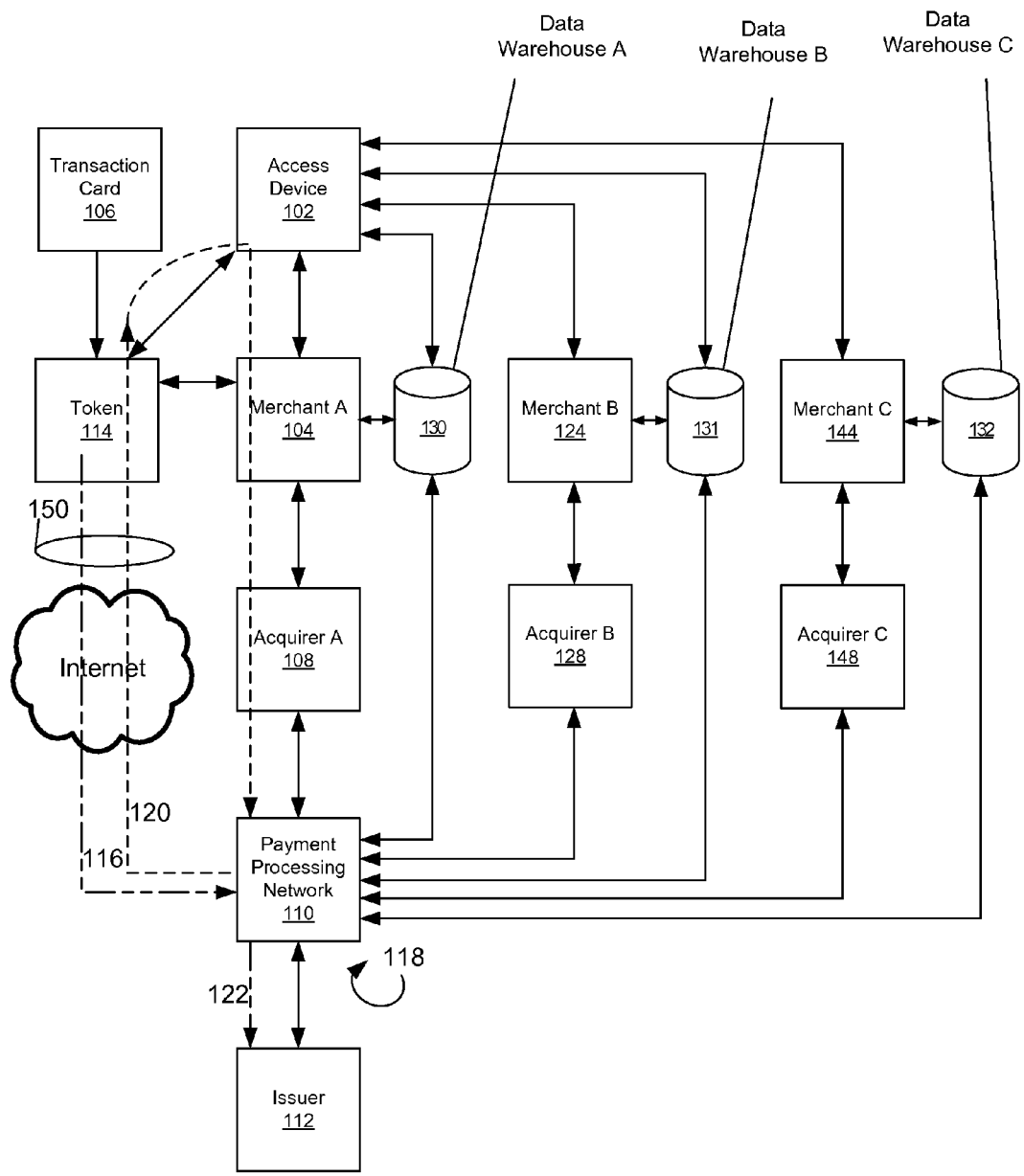
FIGS. 1(*a*) and 1(*b*) depict authentication frameworks in accordance with embodiments of the invention.

Embodiments of the invention are directed to a method of sending non-financial electronic content from a payment processing network to a consumer device via a secure communications channel between the consumer device and the payment processing network.

A payment processing network receives a request from an access device associated with a user to establish a secure communications channel between the access device and the payment processing network. For purposes of the present invention, the terms access device and consumer device may be used interchangeably. The secure communications channel is established over the Internet or some other form of suitable communications link. The request from the access device may be made in advance or in conjunction with a transaction conducted by the user for some type of electronic goods and/or data. The access device according to embodiments of the invention may be in any suitable form. Examples of access devices include point of sale (POS) devices, cellular or mobile phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. The payment processing network may include data processing subsystems, networks, and operations used to support and deliver authorization services, exception file services, and clearing and settlement services. For example, the payment processing network may comprise a server computer, coupled to a network interface, and a database of information. An exemplary payment processing network may include VisaNet™. Payment processing networks such as VisaNet™ are able to process credit card transactions, debit card transactions, and other types of commercial transactions. Today, payment processing networks such as VisaNet™ may be able to communicate directly with users in this way.

A secure communications channel is established between the access device and the payment processing network. This channel is over the Internet or some other suitable communications medium. The secure communications channel is trusted from both ends of the channel, so the delivery of the electronic content is assured and certified. The secure communications channel is able to facilitate the delivery of financial and/or non-financial information and software.

The payment processing network receives non-financial electronic content from a merchant where the non-financial electronic content is selected at the merchant by a user. Electronic content may include many different types of electronic goods and/or data such as electronic songs, books, health care data (e.g., x-rays), software updates, virtual goods (e.g., swords), hardware reconfigured, receipts, medical referrals, and the like. A user selects the electronic goods at a merchant before it is sent to the payment processing network for delivery. For example, a user may go to a merchant's Web site and select an electronic book that the user wishes to purchase.

The payment processing network sends the non-financial electronic content to the access device via the secure communications channel between the access device and the payment processing network. After receiving the electronic content from the merchant, the payment processing network sends the content to the access device associated with the user. The content is sent through the communications channel between the payment processing network and the access device. The electronic goods can also be sent to a token associated with the access device.

The methods as described herein may be used in the context of payment transactions using payment processing systems, which are configured to process credit and debit card transactions. Further, embodiments of the invention are directed to frameworks to securely deliver non-financial electronic content. Such frameworks are set forth in FIGS. 1(a) and 1(b).

I. Systems and Methods for Delivering Non-Financial Electronic Content Through a Secure Communications Channel Between a Payment Processing Network and an Access Device Embodiments of the present invention not only provide for methods and systems for delivering non-financial electronic content between a payment processing network and an access device, but also provide for implementing a secure authentication and encryption switching framework (described later). For example, the framework may be used to authenticate and switch any type of data in an encrypted and secure manner, such that only authorized entities are able to decrypt the data. The framework is applicable to any type of data. One exemplary use of the framework is in providing secure authentication of transactions conducted with a merchant, either through a merchant's physical store or Web site.

FIG. 1(a) shows a block diagram of an underlying system according to an embodiment of the invention. It can also be used to illustrate an exemplary authorization process (described later) involving encryption switching. In some embodiments, the framework may comprise a token 114 that may be used in conjunction with a merchant's POS (point of sale) terminal (or other access device) or a consumer's access device (e.g. consumer's computer for web based transactions). The token will be described in further detail with respect to FIG. 2. The token 114 is a device which is capable of reading any form of a transaction card (or other type of portable consumer device) and communicating through a secure communications channel 150 to a payment processing network 110. The token 114 can be implemented in at least three ways: 1) it could be embedded in a device (e.g. built-in), 2) it could be added onto a phone, or 3) it could be an add on to a computer. The token 114 can include a contactless reader, a smartcard reader, and/or a magnetic stripe reader, and a secure element that is TCP/IP enabled (for both IPv4 and IPv6). The device includes no PIN requirement for connecting an access device to the payment processing network so that a secure communication channel can be established. Additional embodiments of the invention can support at least the following use cases: 1) cryptograms such as CVV and dCVV, 2) over-the-air personalization, 3) key injection, 4) software updates (post issuance), 5) remote PIN reset, 6) authenticating non-payment processing network tokens, and 7) non-payment processing network secure delivery of sensitive information.

The token 114 may be in the form of a USB device that plugs into a consumer's computer. When engaging in Web transactions on, for example, merchant Web sites, rather than type in an account number to complete a transaction, the consumer may present his card in a suitable manner to the token 114 (e.g. swipe the card, wave the card for contactless transactions, etc). In embodiments where the transaction is conducted in a merchant's physical store, the token 114 may be integrated within the merchant's POS system, or may be an addition to the POS system. Regardless of the type of transaction, the consumer will only present his transaction card (or other portable consumer device) to the token 114.

In one example, the user engages in a Web transaction on a merchant Web site using a token 114. Prior to conducting the transaction, the consumer presents his transaction card 106 to the token 114 which may be associated with (e.g., connected to or embedded in) an access device 102. The access device 102 could be a phone, a point of sale (POS) terminal, a client computer, etc. The token 114 may be physically or wirelessly coupled to the access device 102, or embedded therein. The token 114 will in turn read the real account number and other information from the transaction card 106. At this point, a request is sent to the payment processing network 110 to establish a secure communications channel with the token 114. This is shown as step 200 in FIG. 3. In other embodiments where there is no token 114, the secure communications channel 150 is established directly between the payment processing network 110 and the access device 102, which could be a personal computer or the like. After a request has been made, a secure communications channel 150 is established between the payment processing network 110 and the token 114 (and/or access device 102). This is shown as step 210 in FIG. 3. The token 114 (and/or access device 102) is able to communicate in a secure manner with the payment processing network 110. For example, the token 114 may communicate with the payment processing network 110 over the Internet, using a secure protocol such as SSL. Using such a protocol creates an encrypted link which ensures that any communications between the token 114 and the payment processing network 110 are secure, and any data transferred will only be readable by the token 114 or the payment processing network 110. For example, if the token 114 communicates with the payment processing network 110 over the Internet, use of SSL prevents any other machines on the Internet from monitoring the communication.

In the present example, the consumer may conduct the Web transaction with a number of merchants including merchant 104, merchant 124 or merchant 144. For purposes of the present invention, merchant 124 and merchant 144 have the same functionality and serve the same purpose as merchant 104. The merchant 104 may operate a Web site that sells electronic songs and books. The user may select an electronic song for purchase on the merchant's 104 Web site. This is shown as step 220 of FIG. 3. After selecting the electronic content, the user may enter his payment card information onto the Web site. Once entered, an authorization request message may be sent from the merchant 104 to the issuer 112 via the acquirer 108 and the payment processing network 110. (Acquirer 128 or acquirer 148 would be used if the user made a purchase from merchant 124 or merchant 144, respectively). The issuer 112 can authorize the transaction (or decline it if, for example, there are insufficient funds) and send an authorization response message back to the merchant 104 via the payment processing network 110 and the acquirer 108.

Figure 3:
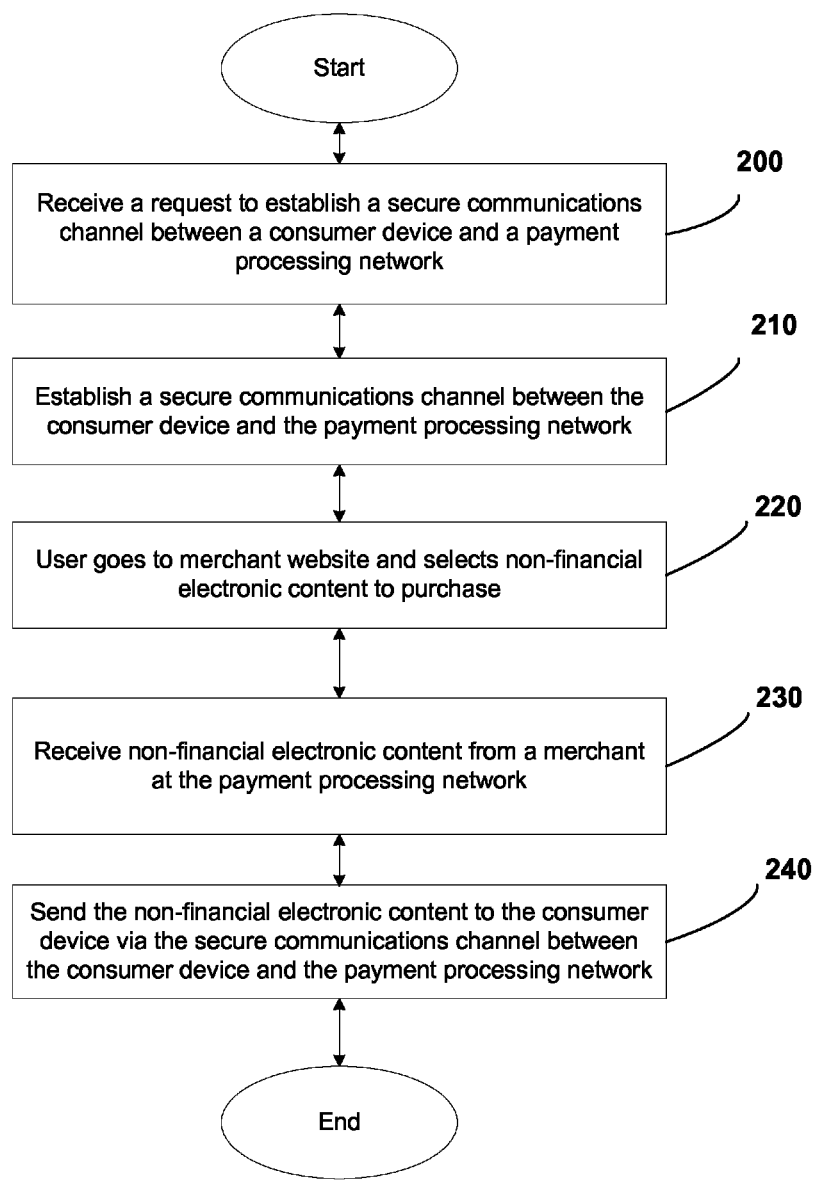
FIG. 3 is a flowchart illustrating steps in a method according to an embodiment of the invention.

After receiving confirmation that the transaction has been approved, the merchant 104 (or merchant 124 or merchant 144) may send the purchased electronic song to the payment processing network 110 (shown in step 230 of FIG. 3). The merchant 104 (or merchant 124 or merchant 144) may send the electronic song to the payment processing network 110 either directly (as shown, in FIG. 1(b), where there is a direct link between the merchants and the payment processing network 110) or via the acquirer 108 (or acquirer 128 or acquirer 148). For purposes of the present invention, acquirer 128 and acquirer 148 have the same functionality and serve the same purpose as acquirer 108. After the payment processing network 110 receives the electronic song, it is ready to be delivered to the user and the payment processing network 110 sends the song to the token 114 (and/or access device 102) via the secure communications channel 150 (shown in step 240 of FIG. 3).

Each merchant in FIG. 1(a) represents a different merchant that is able to sell and/or provide electronic goods and/or data. For example, merchant 104 (as described above) could be an electronic song and book supplier, merchant 124 could be a software upgrade supplier, and merchant 144 could be a doctor's office. The user may purchase a variety of products from each of these merchants. In one example, the user could purchase x-rays or some other type of health care electronic data from merchant 144. The present invention is not limited to the above-referenced merchants. Merchants could include any entity that sells or provides electronic goods and/or data including electronic songs, books, health care data, software updates, virtual goods, hardware reconfigured, receipts, medical referrals, food recipes and the like.

Note that the framework in FIG. 1(a) facilitates the delivery of electronic data (in addition to electronic goods) such as food recipes and x-rays. (For purposes of the present invention, the terms electronic content, electronic goods, and electronic data may be used interchangeably). For example, the user could own a coffee/espresso machine at his/her home which is linked to an access device associated with the user. In some embodiments, the coffee/espresso machine or the like could be the access device. The user could go on a merchant's Web site who provides coffee recipes for sale and purchase one such recipe. The recipe could be sent to the access device from the payment processing network and automatically instruct the coffee machine to make a particular type of coffee associated with the recipe. Another such example is the delivery of a recipe for a cake. If the user owned a device that could make a cake and linked it to the access device, the user could purchase a cake recipe and the recipe could be sent to the access device and instruct the cake machine accordingly. Yet another such example includes x-rays at the doctor's office. This particular type of health care data could be sent to the user from the payment processing network which in turn would be capable of keeping a record of that data. If the user were to misplace the x-ray, the user could contact the payment processing network directly instead of the merchant for another copy of the x-ray. This could prove useful if the merchant (in this case a doctor's office) were to go out of business.

In some embodiments of the invention, the merchant 104 (or merchant 124 or merchant 144) retrieves the electronic content that is the subject of the user's transaction from a data warehouse 130 (or data warehouse 131 or data warehouse 132). In one embodiment, the requested electronic content may be sent to the user upon request. Additionally, the payment processing network 110 may also store the requested electronic content for a particular period of time after the user initially requests the electronic content (e.g. 3-5 years). The electronic content can be forwarded to the user after the initial request during the particular period of time without having to request the content from the merchant again. A data warehouse may store, among other things, various types of electronic content. The data warehouse can act as an escrow agent managed by the payment processing network 110 and can work with merchants to provide an alternative to merchants to store the merchant's electronic goods/data at other locations. This may be an attractive option to the merchant as storage space tends to be expensive and the management of such space burdensome. Upon receiving an order for electronic goods, the merchant 104 (or merchant 124 or merchant 144) retrieves the goods from the data warehouse 130 (or data warehouse 131 or data warehouse 132), where they are already stored. Additionally, this may be an attractive option for the merchant because the payment processing network 110 is better equipped to authenticate the user if the user should request the content be re-sent during the particular period of time. The payment processing network 110 may be able to better authenticate the user or the user's access device 102. For purposes of the present invention, data warehouse 131 and data warehouse 132 have the same functionality and serve the same purpose as data warehouse 130. After retrieving the goods from the data warehouse 130, the merchant 104 sends the goods to the payment processing network 110 directly or via the acquirer 108. In other embodiments, the merchant 104 can arrange for the data warehouse 130 to send the goods that are the subject of the user's transaction directly to the payment processing network 110 to then be forwarded to the user.

Also, should the merchant 104 ever to go out of business, the payment processing network 110 could contact the data warehouse 130 directly and receive the goods. In some embodiments, each merchant may have its own data warehouse or may require multiple data warehouses. In other embodiments, one or more merchants may share the same data warehouse. The merchant and data warehouse could decide amongst themselves as to who is the true owner, distributor and producer of the electronic goods and/or data.

In some embodiments of the invention, the merchant 104 (or merchant 124 or merchant 144) may send the retrieved goods as part of an authorization request to the payment processing network 110. The authorization request message would therefore include the electronic goods and transaction data. An authorization message is typically sent from the merchant 104 to the issuer 112 via the acquirer 108 and the payment processing network 110. The issuer 112 authorizes the transaction (or declines it if, for example, there are insufficient funds) and sends an authorization response message back to the merchant 104 via the payment processing network 110 and the acquirer 108. In this embodiment of the invention, the electronic goods would be embedded in the authorization message sent from the merchant 104 (or merchant 124 or merchant 144).

Figure 1B:
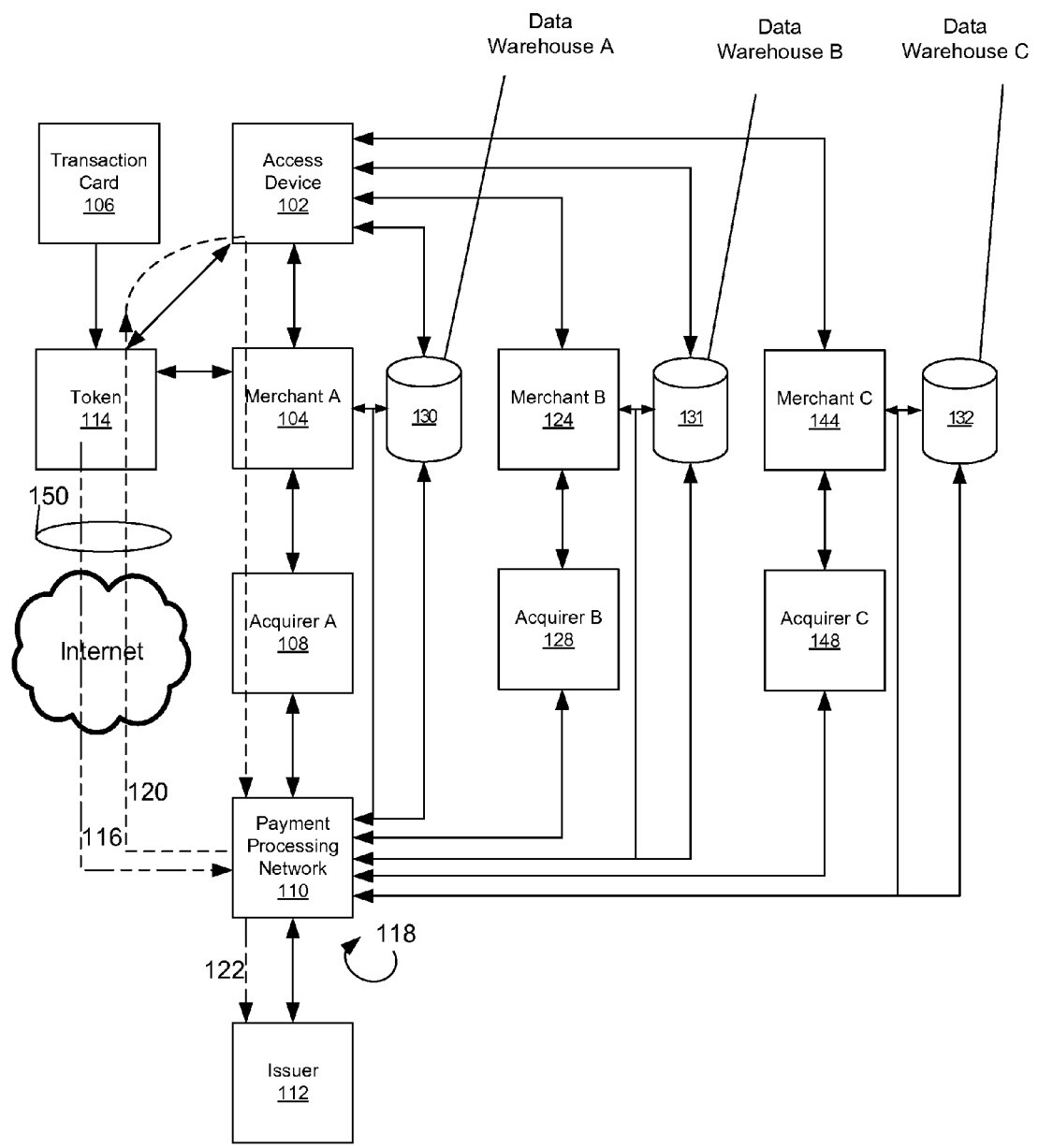

Additional embodiments can be described with reference to FIG. 1(b). FIG. 1(b) is similar to FIG. 1(a), except that FIG. 1(b), as explained above, has a direct link between the merchant 104 (and merchant 124 and merchant 144) and the payment processing network 110. Electronic goods can be sent directly from the merchants to the payment processing network 110 or can be sent via the acquirer 108.

There are a number of advantages to delivering the purchased electronic content to the user through the secure communications channel 150. The secure communications channel 150 is trusted from both ends of the channel, so the delivery of the electronic content is assured and certified. Further, the payment processing network 110 can act as a guarantor of sorts, by guaranteeing that the electronic content was delivered to the user and by confirming that the user has received the electronic content. The payment processing network 110 can also re-send the electronic content directly to the user should the user lose the content. In some instances, the payment processing network 110 may be better equipped than the merchant to re-send the electronic content to the user because the payment processing network 110 has the ability to authenticate the user. Additionally, the payment processing network 110 can send the user any necessary updates to purchased electronic content or patches to damaged electronic content instead of the user having to request the updates and patches directly from the merchant. Also, since the actual content of the purchase passes through the payment processing network 110, the financial data for the transaction can be linked to the electronic content. This can be useful in case, for example, there is a desire to send a certified receipt to the user via the secure channel 150. (In other embodiments, receipts could be delivered to the cardholder through the communications channel 150 between the token 114 and the payment processing network 110. Cardholders may find it beneficial to receive electronic receipts from the payment processing network 110 immediately after conducting a transaction.) Further, because the electronic content is sent by the payment processor network 110, the payment processor network 110 is able to track the types of goods purchased by the user. Based on this information, the payment processor network 110 can provide the user relevant consumer advertising according to the user's purchasing pattern.

Issuers can support embodiments of the invention because improved authentication and data transfer to a cardholder enables new revenue producing services like account consolidation with lower fraud rates (due to improved security). The proposed framework can also handle payload encryption and switching of encrypted packets whereas today's payment processing networks generally only verify tokens. Further, embodiments of the invention increase the loyalty and amount that a user would use a credit card (i.e. stickiness) associated with the payment processing network. This would in turn benefit issuers associated with the credit cards.

Additional embodiments of the invention can support the transmission of any data including account numbers and PIN data provided in legacy environments. It is also possible to extend those attributes in a new authorization model to include JPEG files for signatures, music files for verbal voice prints, and other data (e.g., biometric data) such as the heart rate or fingerprint data for the cardholder. Some embodiments of the invention can relate to authentication and can be encryption focused to provide for non-repudiation assuming a device and token at the cardholder or consumer level along with a PC or computer of some kind at the merchant level. Other embodiments of the invention can provide multi-vendor support, with cross component authorization where several nodes share a trusted security model to enable quick provisioning of applications using payment processing organization (e.g., Visa) certified encryption. Yet other embodiments of the invention can also include a token that is embedded in legacy terminals and point of sale devices, because the solution supports sending traditional account numbers with key entry as well as new POS devices with the token (which does not require an account number or key entry).

Consider the following example. Today, a consumer uses a 16 digit card number plus a CVV (card verification value) code to buy something over the Internet in a card not present transaction to an online merchant. During this transaction, there can be programs and cookies tracking the PAN, CVV, and other data. A fake Web site might capture data as the user enters the data into the fake Web site (the present CNP model essentially forces the merchant to have the PAN and CVV data). The unauthorized person operating the fake Web site can then use the data for fraudulent transactions. Embodiments of the invention can prevent this from happening.

In another example, if a bank issues a chip card and the PIN is on that chip card, and the PIN is locked overseas for the cardholder, then the user must find an ATM with a backend connection to the payment processing network in order to unlock the PIN. This works in some countries—like the UK—but not in all countries like Morocco. Embodiments of the invention can provide the PIN to the cardholder through the secure channel. They can also reset phones with embedded payment processing organization products (like phones in Morocco, not just those in the UK).

It is not desirable to have third parties looking at data that is sent over the secure pipeline between the cardholder and the payment processing network. Certain embodiments of the invention can support the cardholder sending protected (or encrypted) messages to a payment processing network with only the payment processing network decrypting those messages (without forcing a user to type in a PIN) with appropriate keys.

In some embodiments, the token 114 may, using a secure communications channel 150, send 116 the real account number from the transaction card 114 to the payment processing network 110. The payment processing network 110 may then create an identifier that is associated with the real account number, and store 118 this association within a database in the payment processing network 114. In some embodiments, the identifier (e.g., a one-time use account number) is related to a specific transaction. If the identifier is compromised, it would be useless to conduct any other transactions. In some embodiments, the data sent from the token 114 to the payment processing network is encrypted by the payment processing network 110. The payment processing network 110 may be configured to process debit, credit, and prepaid payment card transactions, and may have appropriate authorization and settling and clearing software modules. It may also include a server computer, with a processor and a computer readable medium coupled to the processor. A "server computer" may include one or more computer apparatuses coupled together to perform any intended functions.

The payment processing network may then return 120 the previously created identifier, or encrypted data, to the token 114. In the present example of a consumer conducting a transaction, the identifier may then be sent to the merchant 104. For example, in the case of a consumer purchasing an item on the web, the token 114 may be configured to automatically fill in the payment information on the merchant's Web checkout page. However, instead of using the consumer's real account information, the token 114 may use the previously received identifier. If the transaction is conducted in the merchant's store, the identifier is presented to the merchant 104.

At this point, the merchant 104 (and/or merchant 124 and merchant 144) then sends an authorization request message to the acquirer 108. The authorization request message may request approval of the transaction by the issuer 112. However, instead of using the consumer's real account number in the authorization request message, the previously retrieved identifier is used. As such, neither the merchant 104, nor the acquirer 108 ever has access to the consumer's real account number. The transaction authorization request message may then be sent to the payment processing network 110. The payment processing network 110 may then retrieve the real account number. In some embodiments, this may involve decrypting the identifier, while in other embodiments, it may involve determining the real account number that was used when the identifier was generated. For example, the identifier may be stored in a database when it was created, and the real account number may also be retrieved from the database. Whatever process was used to transform the data received from the token 114 previously into the identifier or encrypted data is now reversed, such that the original data is recovered.

The real account number can then be sent 122 from the payment processing network 110 to the issuer 112 in order for the transaction to be approved or denied. Advantageously, only parties who have a need to know the real account number are ever exposed to the real account number.

Although some examples have been presented in terms of an account number being used to conduct a payment transaction, embodiments of the invention are not so limited. Any and all forms of data that are transmitted from one entity to another in a secure manner have been contemplated. For example, the data may comprise a document, a picture, a sound file, or any other types of data. The framework enables data of any type to be processed and switched securely.

Figure 2:
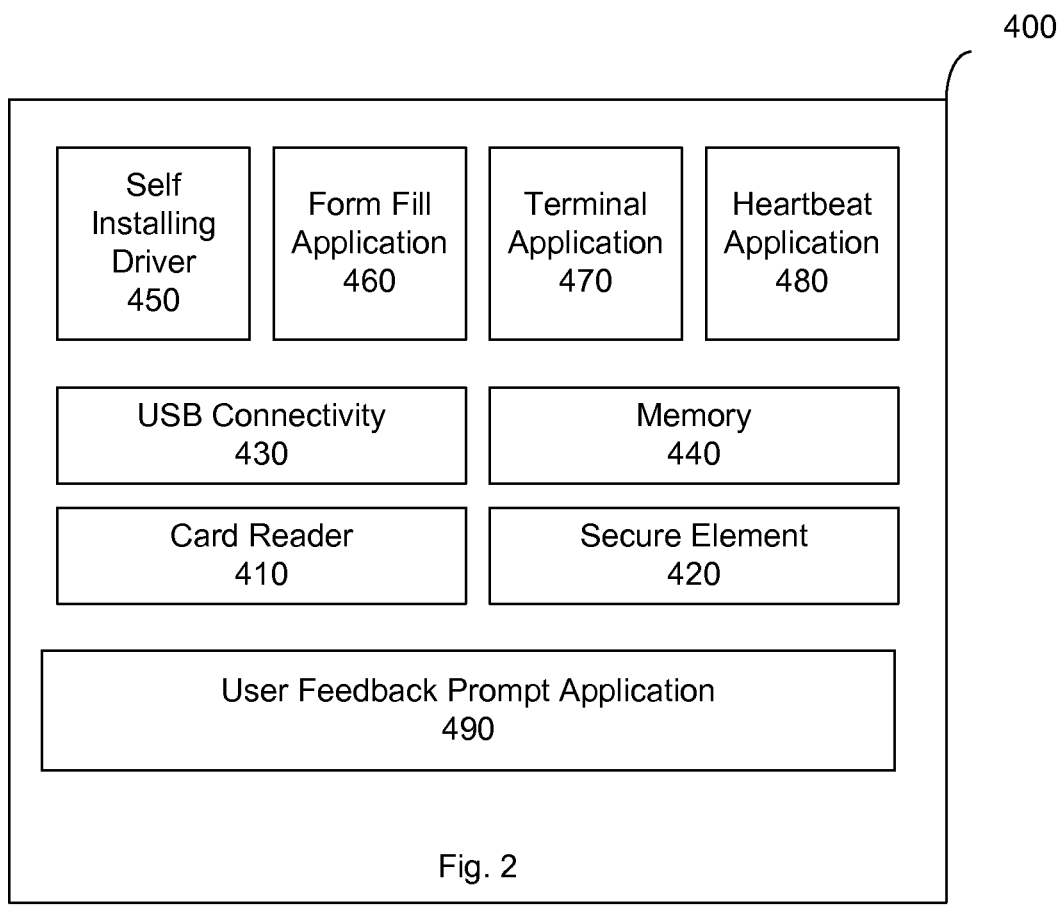
FIG. 2 depicts a block diagram of an exemplary token.

FIG. 2 depicts an exemplary token.

The embodiment of a token illustrated in FIG. 2 is a USB token that includes a USB connectivity module 430, a secure element 420 (e.g., a smart card chip), a wireless/contactless/Chip/Magnetic Stripe reader 410 capable of reading payment data from a consumer device, built in memory 440, a self installing driver 450, a form fill application 460, a terminal application 470, a heartbeat application 480, and a user feedback prompt application 490. The token may also have other features such as a keyboard buffer capability and a unique serial number associated with the token. The token may have no footprint on the PC when it is plugged into a standard PC with Internet connectivity. Encryption keys may also be stored in the USB token.

Although FIG. 2 illustrates a token as something similar to a USB stick, the token may come in other forms. For example, it may be a piece of hardware or other module installed into a computer, consumer device, or other device. For example, the token may be integrated or built into a consumer device such as a cellular phone.

A cardholder may receive a token (such as the one illustrated in FIG. 2) from his or her financial institution. Alternatively, a cardholder may receive a token from another entity on behalf of a financial institution.

A cardholder can connect the token into the USB port of his or her PC. The token can be powered by the PC. The PC can recognize the presence of the token as a valid device, and the token can self-install. The token can also ping the PC to check for Internet connectivity.

If Internet connectivity is available, the token can automatically attempt to establish a background SSL session to an IP Gateway so that it can be used as a part of an authentication process.

An application, such as the self-installing driver 450, may install itself automatically after the token is inserted into and recognized by a PC. The token application is able to connect to a backend host, perhaps at a predefined IP address, using a background secure SSL browser session. Other applications such as the terminal application 470 and heartbeat application 480, may be used to establish and maintain such a browser session. If the session connection is successfully established, the token may identify itself to the IP Gateway by providing its unique serial number and IP address to the IP Gateway. Other info may also be passed (e.g., password).

The token may use a form fill application 460 to fill out transaction card data and any cryptograms associated with a cardholder on a form on a merchant Web site or other applications that provide a form to be filled. Other information may also be filled out by the token, such as shipping addresses, according to various embodiments.

The token may also use a user feedback prompt application 490 to solicit feedback from the user regarding the user's purchasing experience. Once the electronic goods are delivered to the token, the token may prompt the user (through a standard form or the like) to rate his or her purchasing experience. The user may be asked to give information about the timeliness of delivery, the quality of the electronic goods, experience dealing with the merchant, and so forth. The token can then send this feedback to the payment processing network 110 for use on a social networking Web site (as described later) and/or to perform analytics to determine how to make the user experience more effective and efficient.

Although the previous description of a token is presented in terms of a user, it should be understood that tokens may also be used by merchants. For example, the token may be a USB device that is plugged into a merchant's POS system. In some embodiments, the token may be integrated within the POS system or it may be integrated into a user's phone. If it is integrated into a user's phone or is otherwise a separate portable device, it may be physically or wirelessly coupled to an access device such as a POS terminal or the like to establish a secure communications channel with a payment processing network.

Figure 4A:
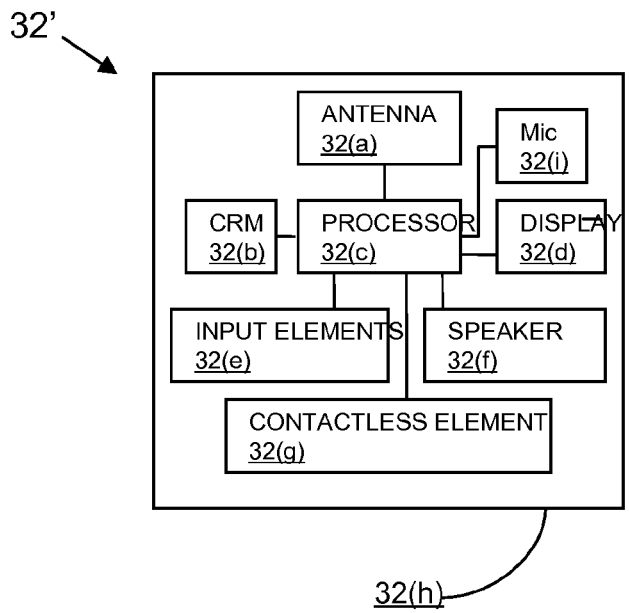
FIGS. 4(*a*) and 4(*b*) depict illustrations of portable consumer devices.
Figure 4B:
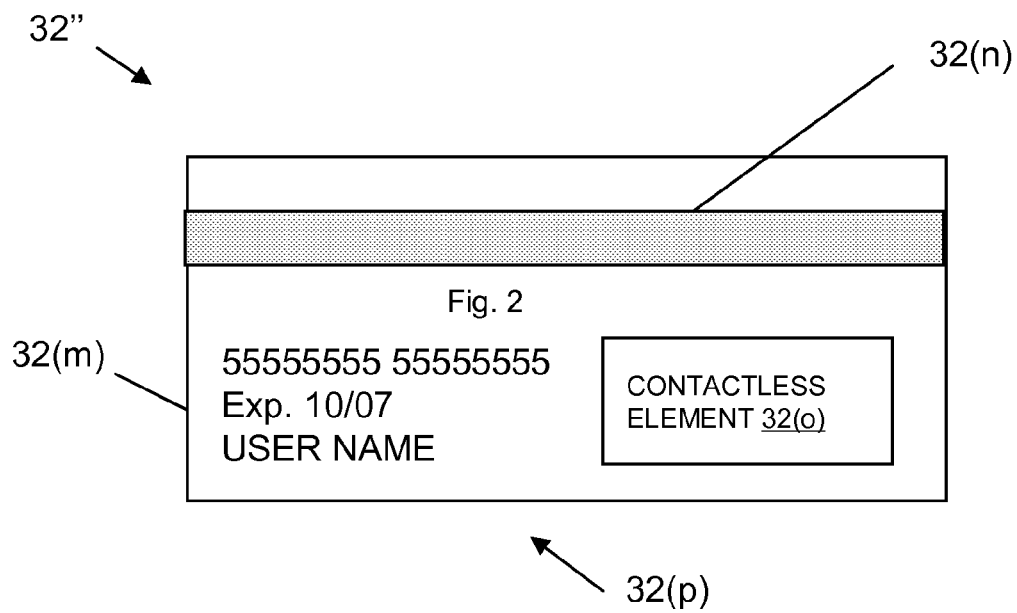
Figure 5:
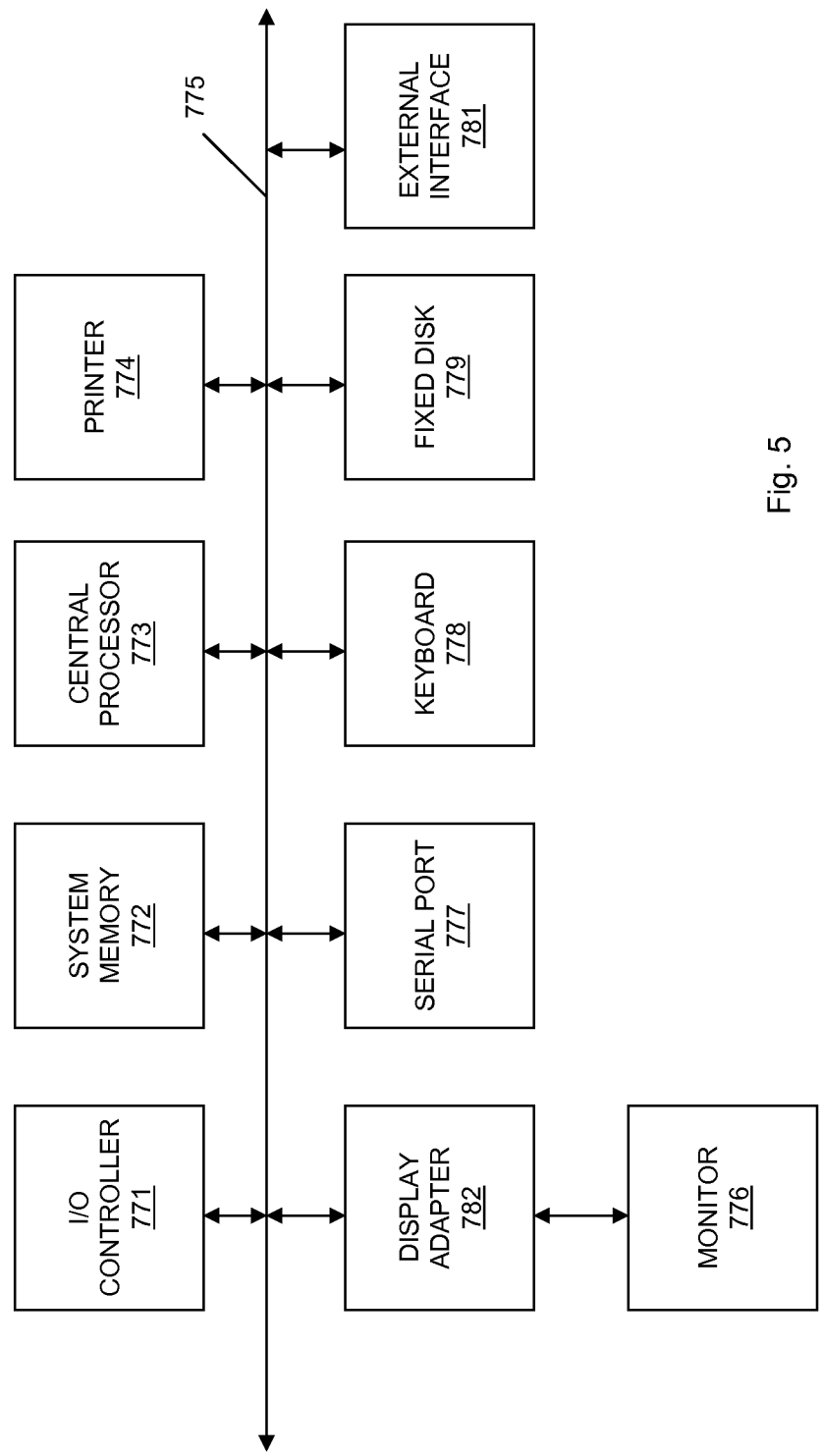
FIG. 5 depicts a block diagram of components in a computer apparatus.

FIGS. 4(a) and 4(b) show diagrams of portable consumer devices. FIG. 5 shows a block diagram of a computer apparatus. They may be used in the systems in FIGS. 1(a) and 1(b).

The portable consumer devices that are used by a user may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic stripe and without a microprocessor), keychain devices (such as the Speedpass™ commercially available from Exxon-Mobil Corp.), etc. Other examples of portable consumer devices include cellular phones (e.g., the phone 34 described above), personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card). Other portable consumer devices may include personal computers, laptops, or other devices capable of communicating over the Internet.

An exemplary portable consumer device 32' in the form of a phone (which may also serve as an access device in some embodiments) may comprise a computer readable medium and a body as shown in FIG. 4(a). (FIG. 4(a) shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a memory that stores data and may be in any suitable form including a magnetic stripe, a memory chip, uniquely derived keys (such as those described above), encryption algorithms, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32.

Information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and an interrogation device. Thus, the portable consumer device 32' is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit her voice through the portable consumer device 32. The portable consumer device 32' may also include an antenna 32(a) for wireless data transfer (e.g., data transmission).

If the portable consumer device is in the form of a debit, credit, or smartcard, as shown in FIG. 1(a) and FIG. 1(b) as transaction card 106, the portable consumer device may also optionally have features such as magnetic stripes. Such devices can operate in either a contact or contactless mode.

An example of a portable consumer device 32" in the form of a card is shown in FIG. 4(b). FIG. 4(b) shows a plastic substrate 32(m). A contactless element 32(o) for interfacing with an access device may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 4(b), the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

The various participants (e.g., the access device, the merchant, the acquirer, the payment processing network, and the issuer) and elements in FIGS. 1(a)-1(b) may operate one or more computer apparatuses to facilitate the functions described herein. Any of the elements in FIGS. 1(a)-1(b) may use any suitable number of subsystems to facilitate the functions described herein. Examples of such subsystems or components are shown in FIG. 5. The subsystems shown in FIG. 5 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

II. Systems and Methods for Gathering Consumer Feedback

Consumer feedback regarding a consumer's purchasing experience may be very useful in facilitating more secure and efficient purchasing experiences for a consumer in the future. This feedback data can be analyzed and used to make recommendations that may lead to a more enjoyable and effortless user experience. According to embodiments of the invention, non-financial electronic content is sent to a payment processing network first before it is sent to the user. Therefore, the payment processing network has access to information regarding merchants and user transaction data which it would not otherwise have were the electronic content delivered to the user directly from the merchant. Moreover, because the payment processing network is more involved in the overall transaction, it may feel the need to find efficient solutions to better the user experience. The payment processing network, for example, could solicit consumer feedback regarding the consumer's purchasing experience as it relates to dealing with particular merchants. That feedback data could be used to possibly disconnect merchants, charge different fees to merchants for processing, and the like. For instance, the consumer feedback may show a large number of complaints about a particular merchant and that merchant may also happen to have excessive chargebacks. In response to this, the payment processing network could charge that merchant a different fee or may simply cut off the merchant from the payment processing network. Therefore, it would be desirable to collect consumer feedback regarding a consumer's purchasing experience, analyze such feedback, and take action based on the analyzed feedback. It would also be desirable to allow consumers to view feedback given by other consumers acknowledging difficulties others had in their past purchasing experiences. Embodiments of the invention address these and other problems individually and collectively.

Embodiments of the invention are directed to a framework for the gathering of consumer feedback by a payment processing network regarding the consumer's purchasing experience.

One embodiment of the invention is directed to a method comprising receiving, at a server computer in a payment processing network, feedback data regarding a transaction conducted by a user at a merchant involving the purchase of non-financial electronic content that is sent from the payment processing network to a consumer device associated with the user through a secure communications channel. Upon receiving the feedback data at the payment processing network, the feedback data is gathered and then analyzed. The payment processing network then takes an action based on the analyzed feedback data. In another embodiment of the invention, the feedback data is displayed on a social networking Web site, where the social networking Web site is managed by the server computer in the payment processing network. FIGS. 1(a) and 1(b) show block diagrams of underlying systems according to these and other embodiments of the invention.

Figure 6:
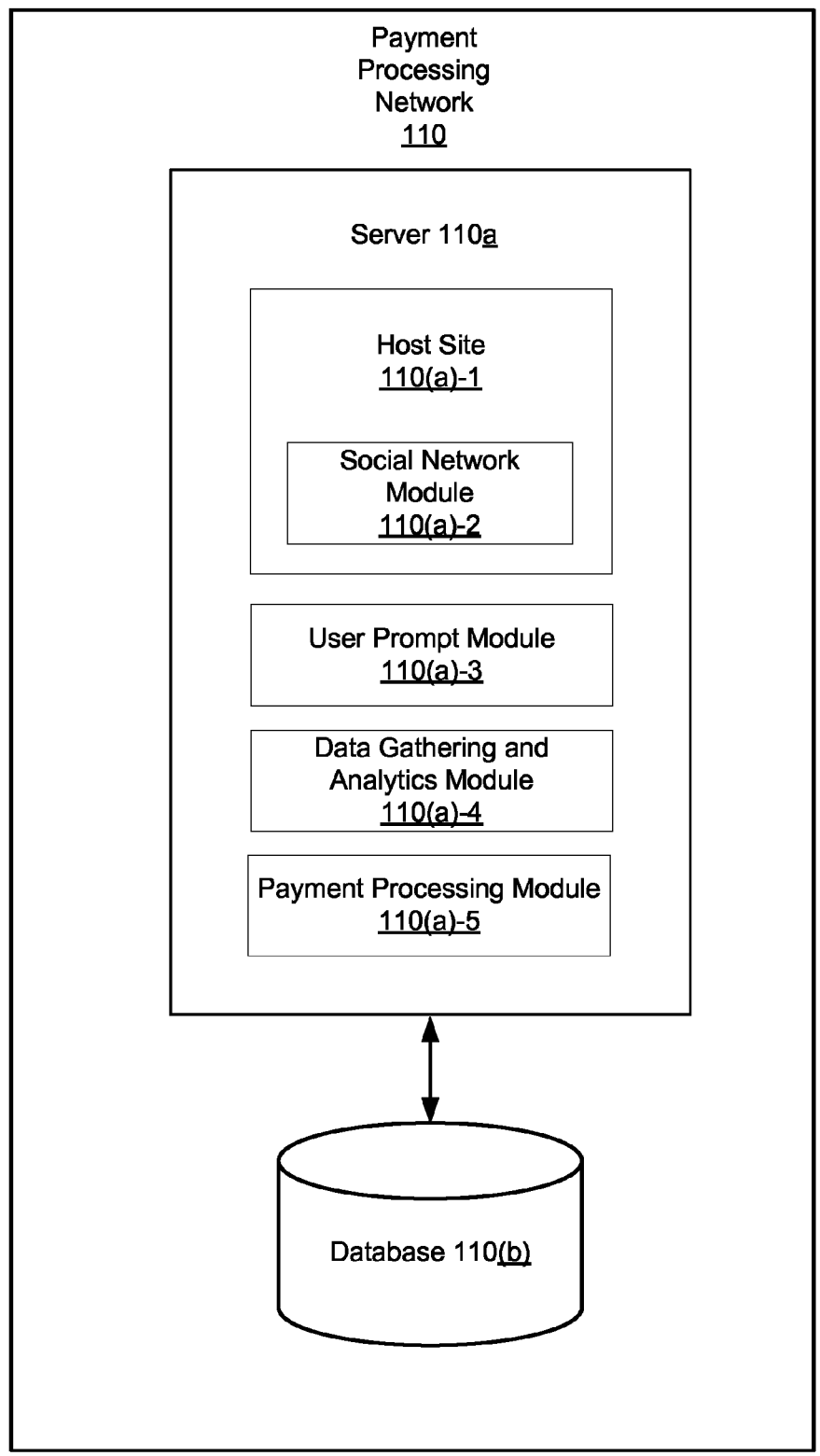
FIG. 6 is a block diagram of a payment processing network according to an embodiment of the invention.

FIG. 6 is a block diagram illustrating some components in a payment processing system network 110 according to an embodiment of the invention. The payment processing network 110 may include a server computer 110(a), and a database 110(b) operatively coupled to the server computer 110(a). A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 110 may use any suitable wired or wireless network, including the Internet.

The server computer 110(a) in the payment processing network 110 may comprise code modules for collecting, gathering and analyzing consumer feedback data and taking an action based on such feedback data. Further, the server computer 110(a) in the payment processing network 110 may comprise code modules for creating and managing a social networking Web site that includes consumer feedback data.

The database 110(b) may store any suitable type of information such as transaction data, feedback data or feedback data criteria.

The server computer 110(a) may also comprise a host site (e.g., a Web site) 110(a)-1, and a number of functional modules. The functional modules may comprise a social network module 110(a)-2, user prompt module 110(a)-3, a data gathering and analytics module 110(a)-4, and a payment processing module 110(a)-5. Each of these modules may comprise any suitable combination of hardware and/or software to accomplish the functions described herein.

Figure 9:
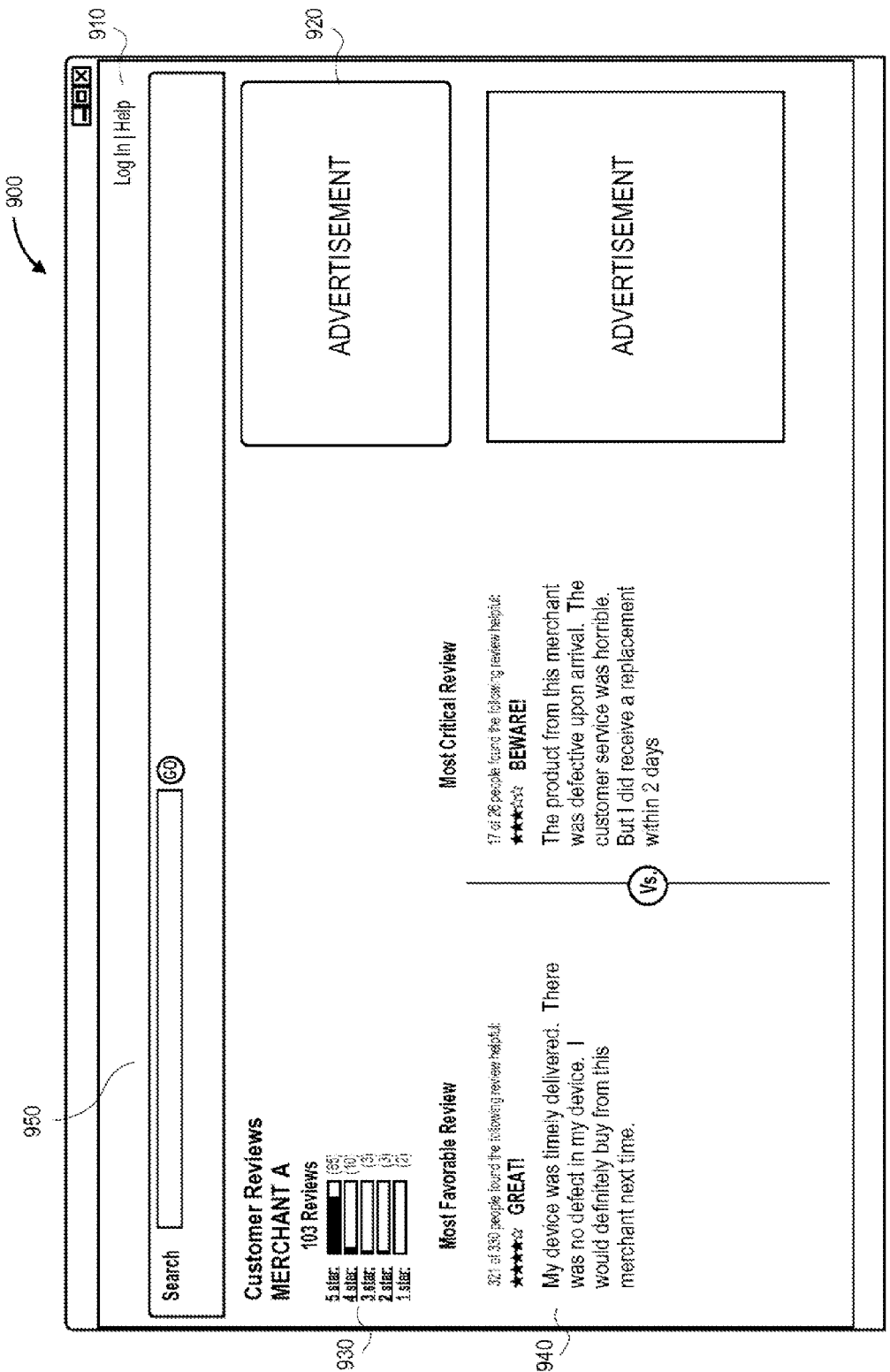
FIG. 9 shows a screen shot of a Web page on a social networking Web site according to an embodiment of the invention.

The Web site 110(a)-1 may be used by a consumer to provide or view consumer feedback regarding purchasing experiences. The social network module 110(a)-2 facilitates this process and supports the social networking aspects of the Web site 110(a)-1. The Web site 110(a)-1 may be used by a consumer to provide feedback regarding the consumer's purchasing experience and view consumer feedback given by others. A consumer may enter consumer feedback directly on the Web site 110(a)-1. The feedback may, for example, relate to dealings with a particular merchant or the reliability of the associated goods sold by the merchants. Such feedback may then be viewed by other consumers. The Web site 110(a)-1 may be considered a type of social networking Web site (i.e. an online platform that focuses on building and reflecting social relations among people who may share interests and/or activities). The Web site 110(a)-1 may include many of the common features of social networking sites. For example, the Web site 110(a)-1 may consist of a representation of each user (often a profile), his/her social links, and a variety of additional services that allow users to interact over the Internet, such as e-mail and instant messaging, which allow users to share ideas, activities, events, and interests within their individual networks. The Web site 110(a)-1 may also include a feature that allows consumer feedback to be displayed in real-time via, for example, a live feed. In other embodiments, the Web site 110(a)-1 may include a feature that allows consumers to rank other consumer reviews based on how helpful and/or accurate they were. The Web site 110(a)-1 may also include a feature that allows a consumer to report reviews that may be inaccurate. An exemplary Web page of a social networking Web site according to embodiments of the invention is shown in FIG. 9 and is described later.

The user prompt module 110(a)-3 may be configured to send prompt messages to consumers at each stage of the purchasing experience in the form of SMS messages, e-mails, and the like to a mobile device associated with the user via a telecommunications network or the Internet. For example, a prompt message may be sent to the user asking the user whether they received the electronic goods, whether the electronic goods were timely delivered, and whether the user was able to find everything they were looking for on a merchant Web site before finalizing the transaction. The prompt message could also ask the user to identify difficulties the user had in dealing with a particular merchant and accordingly rank or rate merchants. In other embodiments, the user prompt module 110(a)-3 may be configured to send prompt messages to a client computer (consumer device) associated with the user.

An exemplary prompt message sent to a client computer is shown in FIG. 8 and is described later. The prompt message is typically a type of user form in a standard message box format (i.e. user form) with various fields in computer language such as Javascript or HTML.

The data gathering and analytics module 110(a)-4 may be configured to gather and analyze consumer feedback data. Once the feedback is entered on a prompt message, the data must be gathered in such a way that it can be analyzed. The data gathering component of the data gathering and analytics module 110(a)-4 may collect the consumer feedback and store it in the database 110(b) or any other suitable storage space in the payment processing network 110. The data gathering component of the data gathering and analytics module 110(a)-4 may then organize the gathered data in a way to be analyzed. The analytics component of the data gathering and analytics module 110(a)-4 may analyze the gathered consumer feedback. The analysis may consist of a determination as to whether certain rules (which could be stored within a table within the data gathering and analytics module 110(a)-4 or other functional module within the payment processing network 110) are met. A table may be used with rules regarding certain conditions in one column of the table and an action to be taken in a corresponding row in another column. If a certain rule (condition) is not met, the data gathering and analytics module 110(a)-4 may take a particular action. For example, if a merchant has a certain number of complaints and also excessive chargebacks, the data gathering and analytics module 110(a)-4 may order the merchant to be disconnected or charge the merchant a higher fee.

The payment processing module 110(a)-5 may comprise appropriate logic to process electronic payments. For example, the payment processing module 110(a)-5 may include an authorization sub-module for receiving and passing authorization request messages to appropriate issuers for approval. It may also comprise appropriate logic to rate or rank merchants according to the analyzed feedback. For example, if many people were unhappy in dealing with a particular merchant, a rating or ranking to that effect may be reflected. This rating, along with other consumer feedback data, could be sent to the social network module 110(a)-2 for it to be displayed on the Web site 110(a)-1. The payment processing module 110(a)-5 may also include a clearing and settlement sub-module for clearing and settling transactions between different issuers and acquirers.

Figure 7:
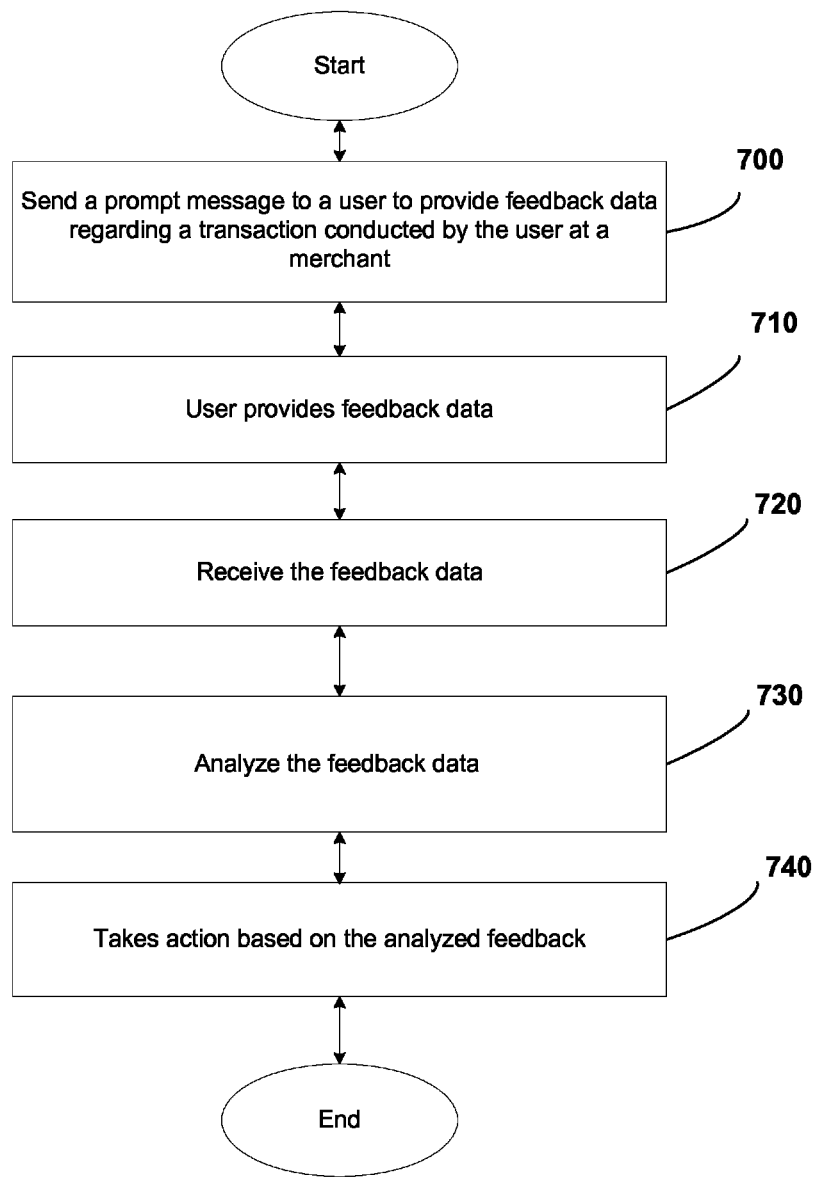
FIG. 7 is a flowchart illustrating steps in a method according to an embodiment of the invention.

FIG. 7 is a flowchart illustrating steps in a method according to an embodiment of the invention. In step 700, the payment processing network sends a prompt message to a user to provide feedback data regarding a transaction conducted by the user at a merchant involving the purchase of non-financial electronic goods. The electronic goods are sent from the payment processing network to a consumer device associated with the user over a secure communications channel between the payment processing network and the consumer device. Such a prompt message may be generated by the user prompt module 110(a)-3 shown in FIG. 6. The prompt message may be sent to a client computer (or token) or mobile device or the like associated with the consumer. The message may be sent to the user at different stages of the purchasing process. For example, when the user receives the non-financial electronic goods, a prompt message may be sent asking the user whether the user received the electronic goods and whether the user had any difficulty in the checkout process at a merchant Web site. The message may also ask the user whether or not the electronic goods were defective and what condition they were in when received. The prompt message can also be sent during the transaction process. For example, a prompt message can be sent immediately after the user has pressed a submit button or the like on a merchant Web site. An exemplary prompt message is shown in FIG. 8. Sample questions that may be asked to a user and corresponding fields for answers are illustrated in fields 810, 820, 830, 840, 850 and 860, respectively. One field asks the user whether they received the goods in a timely manner. Another field asks the user to identify which merchant the goods were purchased from. Yet another field asks the user whether they were happy with their purchase. In some cases the user may select from pre-determined answers such as "yes" or "no" or a particular number ranging from, for example, 1 to 10; in other cases, the user may manually enter an answer for a given question. Embodiments of this invention are not limited to the questions or answer options shown in FIG. 8.

In step 710, the user provides feedback data in response to the prompt message. The user may have the option of either manually typing in an answer to a question or comment on the prompt message or selecting between pre-determined options such as "yes" or "no." In step 720, the payment processing network receives the feedback data provided by the user. The payment processing network may gather and organize the data in such a way for it to be appropriately analyzed. In step 730, the payment processing network analyzes the feedback data provided by the user. The payment processing network may use pre-determined analytics to analyze the data. This may, for example, consist of tracking how many times a particular answer is given in response to a given question on the prompt message. In other embodiments, a table with business rules may be used. A table might list certain conditions in one column such as complaints and unhappiness with a merchant and an action to be taken in a corresponding row in another column. The payment processing network may analyze whether the conditions are met and take an action accordingly, as shown in step 740. For example, if the payment processing network identifies, based on the received feedback, a merchant who is constantly involved in the untimely delivery of electronic goods (to the payment processing network), the payment processing network could take an action such as disconnecting that merchant from the network or charging the merchant an additional fee. Steps 720, 730 and 740 may all be done using the data gathering and analytics module 110(a)-4. The payment processing network may subsequently (or instead) rate or rank the merchants according to the gathered and analyzed data and use the ratings or ranking internally and/or make them available to the public.

In other embodiments of the invention, the feedback data that is gathered and analyzed by the payment processing network 110 is displayed on a social networking Web site. The feedback data could be processed by the social network module 110(a)-2 and ultimately displayed on the Web site 110(a)-1. In other embodiments, a user can directly input the feedback or other consumer data on the Web site 110(a)-1 and the social network module 110(a)-2 can process and arrange the data in such a way to be easily viewed and understood by the user.

An exemplary Web page 900 of a social networking Web site according to an embodiment of the invention is shown in FIG. 9. The Web page 900 illustrates a rating of a particular merchant and specific reviews about the merchant. The Web page 900 in FIG. 9 includes many features. It contains a login and help icon 910 that allows a user to appropriately log in to the Web site under his or her account name and ask or select from a list of questions that they may need answered to assist them in navigating and using the Web site. The Web page 900 may also contain at least one advertisement 920. Such an advertisement 920 can provide a means for the Web site to generate revenue. The advertisement 920 may be of any type including a pop-up, floating ad, expanding ad, etc. Another feature supported by Web page 900 may be a high level summary table 930 of the types of reviews given about a particular merchant. For example, a user may be able to rate a merchant by assigning them a number of "stars" ranging from 1 to 5. The summary table 930 may aggregate those ratings and illustrate how many users gave a particular merchant 5 stars or 4 stars or so forth. The particular ratings can be inputted directly by the user on the social networking site or could be sent from the payment processing network 110. Yet another feature of the Web page 900 may be a listing of the most favorable review 940. The most favorable review may be selected manually by the Web site or may be based on objective criteria. For example, the most favorable review may be a review which included a rating of 5 stars (assuming that the value 5 was the highest). Other users may have the option of voting on whether they found a particular review helpful. The Web page 900 may also display a most critical review, which includes negative comments about a merchant. Lastly, the Web page 900 may contain a search tool 950. This search tool 950 may be used to search the contents of the networking Web site including information about a particular merchant or electronic goods sold by the merchant. The present invention is not limited to the various features set forth in Web page 900.

Methods according to embodiments of the invention may be described with reference to FIGS. 1-9. Although specific sequences of steps are described, it is understood that embodiments of the invention are not limited to the order of the specific steps described, and that any suitable combination of steps may be included in embodiments of the invention.

Embodiments of the invention are not limited to the above-described embodiments. For example, although separate functional blocks are shown for an issuer, payment processing network, and acquirer, some entities perform (e.g., Discover, AMEX, etc.) all of these functions and may be included in embodiments of invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

Additional embodiments of the invention are shown in the attached Appendix, which is herein incorporated by reference.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, at a payment processing network, a request to establish a secure communications channel between a consumer device and the payment processing network;
   establishing the secure communications channel with the consumer device;
   receiving non-financial electronic content from a merchant at the payment processing network, wherein the non-financial electronic content is selected at the merchant by a user associated with the consumer device;
   sending the non-financial electronic content to the consumer device via the secure communications channel between the consumer device and the payment processing network; and
   providing a certified receipt to the user, the certified receipt certifying that the non-financial electronic content is assured and certified by the payment processing network.

2. The method of claim 1 wherein the non-financial electronic content comprises one or more of: electronic songs, books, health care data, software updates, virtual goods, hardware reconfigured, receipts, and medical referrals.

3. The method of claim 1 wherein the consumer device is a personal computer.

4. The method of claim 1 wherein the consumer device is in communication with a verification token.

5. The method of claim 4 wherein the verification token is a USB stick.

6. The method of claim 1 wherein the payment processing network is adapted to process credit and debit card transactions.

7. The method of claim 1 wherein the merchant receives the non-financial electronic content from a data warehouse that is in connection with the merchant.

8. The method of claim 1 wherein the payment processing network is able to receive the non-financial electronic content directly from a data warehouse that is in connection with the merchant.

9. The method of claim 1 wherein the non-financial electronic content is sent from the merchant to the payment processing network as part of a transaction authorization request message.

10. The method of claim 1 wherein the merchant is located online and may be accessed via a web site.

11. A method comprising:
    sending, at a consumer device, a request to establish a secure communications channel between the consumer device and a payment processing network;
    establishing the secure communications channel with the payment processing network;
    receiving non-financial electronic content from the payment processing network via the secure communications channel between the consumer device and the payment processing network, wherein the non-financial electronic content was sent by a merchant to the payment processing network and was selected at the merchant by a user associated with the consumer device, and receiving a certified receipt from the payment processing network, the certified receipt certifying that the non-financial electronic content is assured and certified by the payment processing network.

12. The method of claim 11 wherein the non-financial electronic content comprises one or more of: electronic songs, books, health care data, software updates, virtual goods, hardware reconfigured, receipts, and medical referrals.

13. The method of claim 11 wherein the consumer device is a personal computer.

14. The method of claim 11 wherein the consumer device is in communication with a verification token.

15. The method of claim 14 wherein the verification token is a USB stick.

16. The method of claim 11 wherein the payment processing network is adapted to process credit and debit card transactions.

17. The method of claim 11 wherein the merchant receives the non-financial electronic content from a data warehouse that is in connection with the merchant.

18. The method of claim 11 wherein the payment processing network is able to receive the non-financial electronic content directly from a data warehouse that is in connection with the merchant.

19. The method of claim 11 wherein the non-financial electronic content is sent from the merchant to the payment processing network as part of a transaction authorization request message.

20. The method of claim 11 wherein the merchant is located online and may be accessed via a web site.

* * * * *